(12) United States Patent
Diriye et al.

(10) Patent No.: US 11,093,871 B2
(45) Date of Patent: Aug. 17, 2021

(54) FACILITATING MICRO-TASK PERFORMANCE DURING DOWN-TIME

(71) Applicant: International Business Machines Corporation, Armonk, NY (US)

(72) Inventors: Abdigani Diriye, Nairobi (KE); Shikhar Kwatra, Morrisville, NC (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/954,560

(22) Filed: Apr. 16, 2018

(65) Prior Publication Data

US 2019/0318291 A1 Oct. 17, 2019

(51) Int. Cl.
| | | |
|---|---|---|
| *G06Q 10/06* | (2012.01) | |
| *G06Q 30/00* | (2012.01) | |
| *G06F 3/0482* | (2013.01) | |
| *H04L 29/08* | (2006.01) | |
| *G06F 3/0483* | (2013.01) | |
| *G06F 40/174* | (2020.01) | |

(52) U.S. Cl.
CPC ........... *G06Q 10/063112* (2013.01); *G06Q 10/06316* (2013.01); *G06F 3/0482* (2013.01); *G06F 3/0483* (2013.01); *G06F 40/174* (2020.01); *G06Q 30/016* (2013.01); *H04L 67/18* (2013.01); *H04L 67/306* (2013.01)

(58) Field of Classification Search
CPC ...... G06Q 10/063112; G06Q 10/06316; G06F 40/174; G06F 3/0482; G06F 3/0483; G06C 30/016; H04L 67/18; H04L 67/306

USPC ........................................................ 705/7.14
See application file for complete search history.

(56) References Cited

U.S. PATENT DOCUMENTS

| | | | | |
|---|---|---|---|---|
| 5,966,126 A | * | 10/1999 | Szabo | ................ G06F 16/2428 715/762 |
| 6,400,804 B1 | * | 6/2002 | Bilder | ................... H04M 3/428 379/114.13 |
| 6,404,858 B1 | | 6/2002 | Farris et al. | |
| 6,724,887 B1 | | 4/2004 | Eilbacher et al. | |
| 6,819,759 B1 | | 11/2004 | Khuc et al. | |
| 6,829,332 B2 | | 12/2004 | Farris et al. | |

(Continued)

OTHER PUBLICATIONS

Optimizing wait time using smart phones as a patient empowerment tool. Al-haratani, Ramadan E., M.A., California State University, Long Beach, 2010, 44; 1490361.*

(Continued)

*Primary Examiner* — Timothy Padot
(74) *Attorney, Agent, or Firm* — Shimon Benjamin; Otterstedt, Wallace & Kammer, LLP

(57) ABSTRACT

A method includes obtaining a user profile that includes a user's affinities to each of a plurality of micro-tasks; estimating a duration of down-time for the user; estimating task selection factors responsive to the user profile and to the estimated duration of down-time; generating a list of micro-tasks responsive to the task selection factors; ranking the list of micro-tasks according to the user's affinities; partitioning the down-time according to the ranked list of micro-tasks; and presenting one or more of the micro-tasks to the user, according to the partitioning of the down-time, by altering operation of a user device.

19 Claims, 8 Drawing Sheets

(56) References Cited

U.S. PATENT DOCUMENTS

| | | | |
|---|---|---|---|
| 6,831,663 B2* | 12/2004 | Chickering | G06Q 10/02 705/5 |
| 7,024,464 B1* | 4/2006 | Lusher | G06F 16/9577 709/219 |
| 7,050,569 B1 | 5/2006 | Weaver et al. | |
| 7,542,553 B2 | 6/2009 | Gurfein et al. | |
| 7,986,776 B2* | 7/2011 | Hamilton, II | G06F 21/6209 379/266.01 |
| 8,379,830 B1 | 2/2013 | Naik et al. | |
| 8,411,830 B2 | 4/2013 | Gilbert et al. | |
| 8,630,403 B2 | 1/2014 | Brown et al. | |
| 8,777,732 B2 | 7/2014 | Robbins et al. | |
| 9,014,360 B2 | 4/2015 | Roberts et al. | |
| 2003/0161464 A1* | 8/2003 | Rodriguez | H04M 3/493 379/266.01 |
| 2005/0243104 A1 | 11/2005 | Kinghorn | |
| 2007/0067198 A1* | 3/2007 | Eggleston | G06Q 10/063114 705/7.15 |
| 2008/0270230 A1 | 10/2008 | Hendrickson et al. | |
| 2008/0310717 A1 | 12/2008 | Saathoff et al. | |
| 2009/0077025 A1 | 3/2009 | Brooks et al. | |
| 2009/0077057 A1* | 3/2009 | Ducheneaut | G06Q 30/02 |
| 2009/0100178 A1* | 4/2009 | Gonzales | G06F 9/50 709/226 |
| 2009/0164584 A1 | 6/2009 | Szetu et al. | |
| 2010/0312624 A1* | 12/2010 | Bilenko | G06Q 30/02 705/14.5 |
| 2012/0030125 A1* | 2/2012 | RamaKrishnanNair | G07C 1/12 705/319 |
| 2012/0191531 A1* | 7/2012 | You | G06Q 30/0243 705/14.42 |
| 2012/0191770 A1* | 7/2012 | Perlmutter | G06K 9/00483 709/201 |
| 2013/0080427 A1* | 3/2013 | Cross | G06F 16/3326 707/728 |
| 2013/0218620 A1* | 8/2013 | Liu | G06Q 10/06 705/7.14 |
| 2013/0282757 A1 | 10/2013 | Ehsani et al. | |
| 2014/0282135 A1 | 9/2014 | Segre | |
| 2014/0358260 A1* | 12/2014 | Burgin | G06Q 30/0277 700/91 |
| 2015/0088624 A1* | 3/2015 | Frederick | G06Q 30/0209 705/14.12 |
| 2015/0195406 A1* | 7/2015 | Dwyer | G06F 21/6254 379/265.07 |
| 2015/0310300 A1* | 10/2015 | Hou | G06Q 30/0631 705/26.7 |
| 2017/0195486 A1 | 7/2017 | Li et al. | |
| 2018/0150768 A1* | 5/2018 | Togia | G06F 40/211 |

OTHER PUBLICATIONS

Anton McConville, "Measuring emotion with IBM Watson speech to text and tone analysis", IBM Cloud Blog. Nov. 2016. pp. 1-11.*
Kirkpatrick, Keith. (2017). AI in contact centers. Communications of the ACM. 60. 18-19. 10.1145/3105442.*
Peter Mell and Timothy Grance, "The NIST Definition of Cloud Computing". NIST Special Publication 800-145. Sep. 2011, pp. 1-7.
Mcguire et al., . "Rational temporal predictions can underlie apparent failures to delay gratification." Psychological Review 120.2 (2013): 395, pp. 1-24, Published online Mar. 4, 2013.
Katz et al., "Prescription for the waiting-in-line blues: Entertain, enlighten, and engage." MIT Sloan Management Review 32.2 (Winter 1991): 44, pp. 1-12.

* cited by examiner

Micro-Task Creation Form

Enter the title of the Micro-Task      318

[Enter the title]

What is the category of the micro-task?

[Category ▽]  328

Other?

[Enter other category]

Enter micro-task description and instructions.

[Enter description/instructions here]  332

Enter micro-task questions

| What is your opinion of the presidential candidates? | Add | Delete |
| Enter questions here | Add | Delete |

Upload file or images for micro-task

[Upload ⌃]

Rewards

[Category ▽] [Amount]  334

Enter Duration of Micro-Task

From                     To

[Enter Date]    [Enter Date]  330

[ Post ]

*FIG.4*

Micro-Task List

Filter.

Search for your Micro-Task

| Thoughts of presidential candidates | Search ▽ | *336*

*338* Result: 10 Active Tasks *340*

Opinion of presidential candidates > *342*

Description

Please let us know what your thoughts are of candidate X

| User ID | Database_Column2 | Quality Estimation | Quality Estimation | |
|---|---|---|---|---|
| 1231 | Overall very disappointed with candidate | 0.89 | Accept | Reject |
| 4324 | No comment | 0.2 | Accept | Reject |
| 343 | N/A | 0.2 | Accept | Reject |
| 4324 | I believe in this candidate | 0.6 | Accept | Reject |

*319*

Geographic Location of Respondents

Total Cost of Micro-Task So Far $25.00

Duration
From                To
1/12/2017          30/12/2017

Resume/Pause Micro-Task

Resume    Pause

Can you label these photos of presidential candidates >

FACILITATING MICRO-TASK PERFORMANCE DURING DOWN-TIME

BACKGROUND

The present invention relates to the electrical, electronic and computer arts, and more specifically, to facilitating useful work during down-time such as customer service on-hold time.

Several million users daily call to get a customer service (e.g., for banking service, revenue authority, utility companies, retailers, airlines agents, publishers, etc.). Service providers implement tools to reduce down-time and improve customer experience, by monitoring the interactions of their customer throughout a service experience, e.g., to improve the quality of service, to understand various characteristics and factors of the customer (and customer agent) such as a perceived level of stress, frustration, etc. Such data can further be consumed by computer algorithms and intelligent applications (i) to infer customer experience, (dis)satisfaction level, sentiment, emotion, etc.; (ii) to infer customer service effectiveness; or (iii) to determine product recommendation, etc.

SUMMARY

Principles of the invention provide techniques for facilitating micro-task performance during down-time. In one aspect, an exemplary method includes obtaining a user profile that includes a user's affinities to each of a plurality of micro-tasks; estimating a duration of down-time for the user; estimating task selection factors responsive to the user profile and to the estimated duration of down-time; generating a list of micro-tasks responsive to the task selection factors; ranking the list of micro-tasks according to the user's affinities; partitioning the down-time according to the ranked list of micro-tasks; and presenting one or more of the micro-tasks to the user, according to the partitioning of the down-time, by altering operation of a user device.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Improved crowdsourced-based coordination of the use of human intelligence to perform tasks (e.g., labeling, feedback, voting, etc.) that computers are currently unable to do.

Determining affinity and task engagement coefficient that reflect a degree of task execution mastery level, or similarity between two or more users by exploiting historical on-hold customer waiting durations so as to infer an affinity for the new user to the existing tasks.

Identifying task selection factors dynamically (e.g., related to language translation, voice training, image classification, location or geo-spatial context, etc.) based on the estimated down-time T and analysis of the user profile.

Dynamically optimizing display elements while taking into consideration the user device characteristics.

Structuring an incentive/reward function based on various parameters such as task importance, task completion, quality of responses.

Determining micro-tasks based on task selection factors dynamically user characteristics found in their user profile such as the user's language spoken, location, expertise, etc.

Locally partitioning an estimated down-time into N segments (temporal/spatial) to optimally sequence generated or selected tasks.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 depicts a web form for creating a micro-task description, according to an exemplary embodiment;

FIG. 5 depicts a web form for searching a library of micro-tasks, according to an exemplary embodiment;

DETAILED DESCRIPTION

Figure 1:
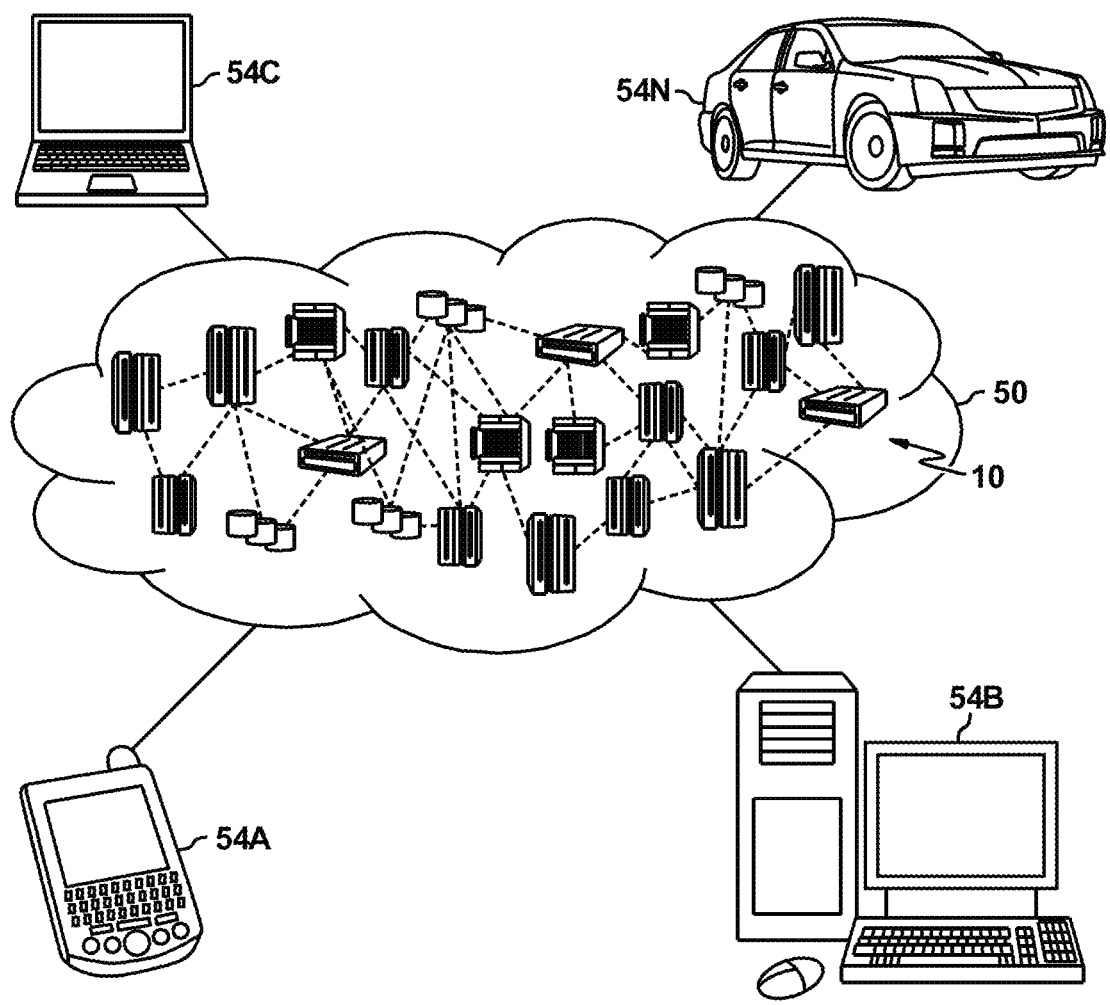
FIG. 1 depicts a cloud computing environment according to an embodiment of the present invention.

Exemplary embodiments of the present invention relate to facilitating useful work during down-time such as customer service on-hold time. Human intelligence can be crowdsourced to perform micro-tasks that computers currently are unable to perform. Generally, such micro-tasks relate to training artificial intelligence. For example, choosing the most informative among several photographs of a storefront, writing product descriptions, or identifying performers on music tracks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
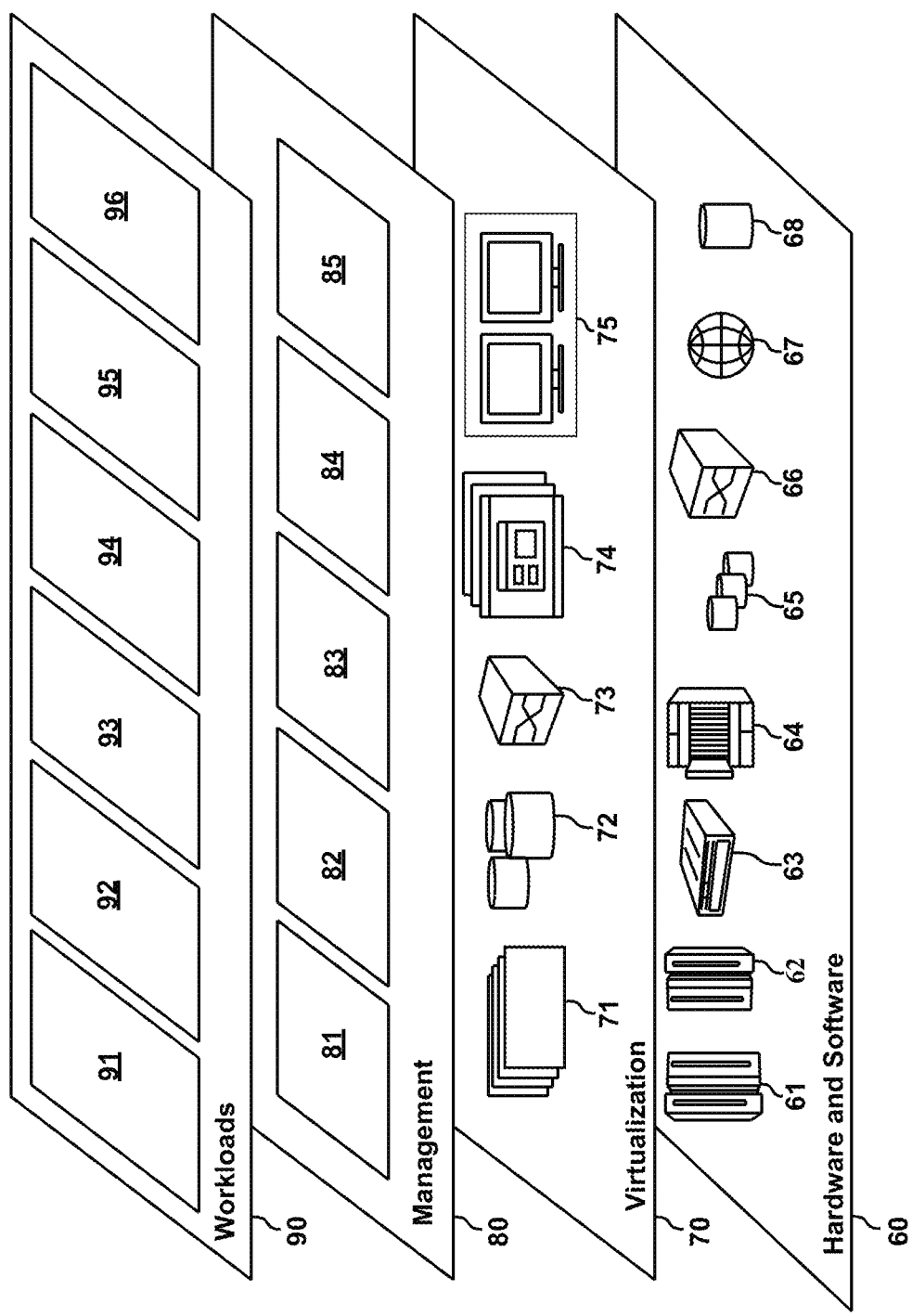
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform micro-tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and micro-tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an interactive system 96 for facilitating micro-task performance during down-time.

Figure 3:
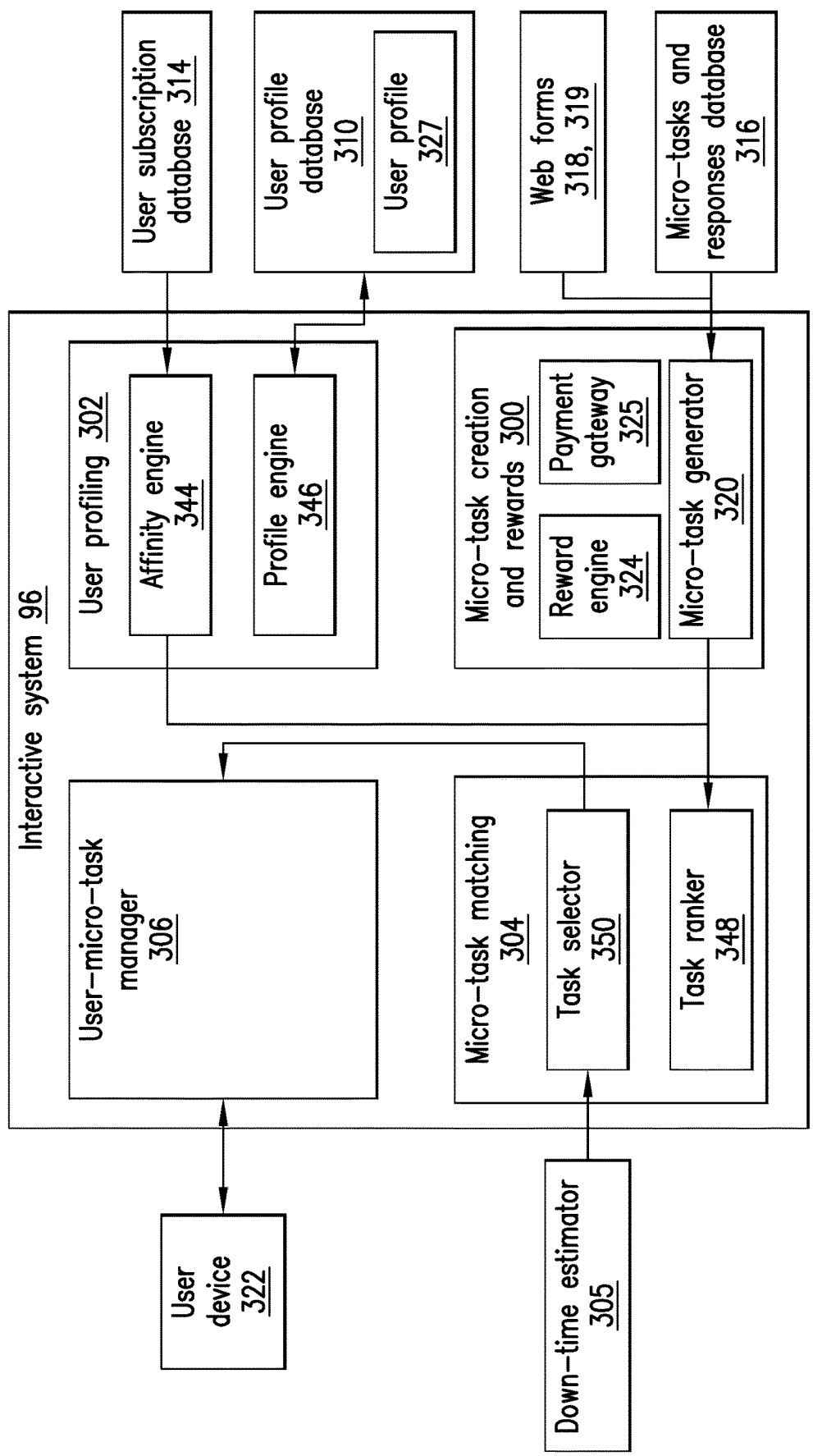
FIG. 3 depicts an interactive system for facilitating micro-task performance during down-time, according to an exemplary embodiment.

Such an interactive system 96, as shown in FIG. 3, incorporates a micro-task creation and rewards module 300, a user profiling/micro-task affinity module 302, a micro-task matching module 304, a down-time estimator module 305, and a user-micro-task manager module 306. The interactive system 96 interfaces with a customer service manager module 308 and with a user profile database 310 that stores a plurality of user data (e.g., previous call logs, identified skill, expertise and knowledge levels, past experiences) via the Internet or a similar communication network 312. The interactive system 96 also interfaces with a user subscription database 314 and with a micro-tasks and responses database 316 via the communication network 312. The interactive system 96 serves web forms 318, 319 for micro-task creators to submit micro-tasks and to review submitted micro-tasks as well as micro-tasks produced by an internal micro-task generator 320. Additionally, the interactive system 96 serves micro-tasks to one or more user devices 322 via the customer service manager module 308.

The micro-task creation and rewards module 300 includes the micro-task generator 320 as well as a reward engine 324 and a payment gateway 326. Creating and generating micro-tasks can either be i) based on user-supplied micro-tasks (e.g., marketers, researchers, businesses, individuals via the web form 318) or ii) learned from previously created or executed micro-tasks. Accordingly, the micro-task generator 320 works from the micro-tasks and responses database 316 to learn and generate new micro-tasks that are consistent with micro-tasks previously supplied by micro-task creators via the web form 318. For example, playing a podcast of interest to the user and forming a questionnaire on the podcast, corresponding to the user's hobbies or interests fetched from social media information or from similar activity monitoring scenarios. The user's hobbies and interests compose part of the user profile 327 that is maintained by the user profiling module 302, further discussed below.

The micro-task generator 320 can be implemented as a neural network that has learned a pattern of micro-task types corresponding to user profile data. Generally, a cognitive neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A cognitive neural network can implement supervised, unsupervised, or semi-supervised machine learning.

The micro-tasks and responses database 316 stores micro-tasks and links the micro-tasks by their similarity, demographic relevance, affinity scores, context, etc. such that runtime selection and discoverability can easily be facilitated. The web forms 318, 319 facilitate GUIs, which present functionality to compose new micro-tasks and view/monitor and resume/cancel existing micro-tasks based on whether certain criteria have been met (e.g., number of responses, quality of responses, etc.). The web form 318 contains fields, as shown in FIG. 4, in which a micro-task creator may compose a new micro-task and assign features to the micro-task such as type 328 (e.g. question and answering, labelling, translation, etc.), duration 330, description 332, and optionally (not shown) one or more cohorts of preferred users (e.g., users from a specific geo-location, skillset, language, background, etc.). The micro-task creator also can specify a type of reward 334 (e.g. cryptocurrencies like bitcoin, loyalty points, fiat currency, etc.) and amount. Referring to FIG. 5, the web form 319 includes fields by which a micro-task creator can search 336 micro-tasks the creator has made and view the search results 338 including a status 340 of a micro-task and an overview 342 of responses received to a micro-task.

The micro-task generator 320 may use custom NLP ("natural language processing") to assign labels to the micro-tasks in the micro-task and responses database 316, in response to the content initially provided by the micro-task creators such as the description, type, and content and responses required. Such labels include, but are not limited to, "question and answering", or "image labelling", etc. Each label is stored in the micro-tasks and responses database 316, which is accessed by the micro-task matching module 304 for assigning one or more micro-tasks to a user when a down-time determined by the down-time estimator module 305 is sufficient for micro-task completion. Then the user-micro-task manager module 306 stores responses from the on-hold user in the micro-tasks and responses database 316.

The reward engine 324 computes an approximate recommended reward size and type to offer users based on historic logs of similar micro-task, in cases where there is a large variation between the system's estimated reward and the reward entered by the micro-task requestor, an alert is sent back recommending the requestor to amend this.

The cost and reward category is computed as a function of historic tasks, estimated completion times of similar tasks, estimation of cognitive workload, and number of active users available to complete the micro-task.

As a way of an example, historic micro-tasks might include question-answering micro-tasks of a user's opinion of a presidential candidate or opinion of a new shampoo ad. For micro-tasks in this category, the micro-tasks and responses database 316 includes data on the amount offered and the number of responses received from users. The system computes the profit-maximizing price for this micro-task by applying—in one embodiment—the following formula, where η is the price elasticity of the micro-tasks. MC of the marginal cost of in creating an additional micro-task. Thus, the profit-maximizing price (P) equals:

$$P = MC \times \left(\frac{\eta}{\eta + 1}\right)$$

In another embodiment, the category of rewards and amount for the micro-task is entered by the micro-task requestor and is used statistically. In a third embodiment, the reward category and amount can be calculated dynamically and in real-time based on the availability of active users, and based on factors such as a profile, their historic reward preference (e.g. if they have selected bitcoin as their mode of payment), the average/minimum amounts they would complete a micro-task for, types of preferred tasks, etc.

The payment gateway 325 facilitates movement of value from the micro-task requestors to the users once the micro-task has been completed to a satisfactory level which is determined by the micro-task requestors feedback or through classification of historical labelled micro-tasks of "good" responses and "bad" responses.

The user profiling module 302 creates user profiles from a plurality of user-generated data sources such as previous call logs, identified skill, expertise and knowledge levels, past experiences, etc. and stored in the user profile database 310. The user profiling module 302 includes an affinity engine 344 and a profile engine 346. The affinity engine 344 builds a user-micro-task graph that connects a user's profile with specific micro-tasks that they have undertaken in the past. The affinity engine 344 assigns weights to the graph edges that connect the micro-tasks to the user, according to data from the micro-tasks and responses database 316. Generally, the weights are based on the frequency with which the user has selected that type of micro-task selected and on each micro-task requestor's rating of the user's responses toward level of satisfaction of the micro-task. For example, if an on-hold user completed a translation micro-task to a high level of satisfaction then the affinity engine 344 would assign relatively high weight to the edge between the user and the translation micro-task.

The profile engine 346 makes use of user-supplied data and publicly available data to compile user characteristics such as the user's languages spoken, location, expertise, hobbies, interests, etc. User-supplied data may include, for example, explicit user preferences (e.g., specific channels or types of micro-tasks such as image labelling, translation, etc.), demographics, preferred reward types (crypto-currency, fiat currency, loyalty points, etc.), preferred micro-task requestors, and/or cognitive state data, which can be derived from text messages, phone conversations, and social media activities. Publicly available data may include, for example, social media profiles (e.g., FACEBOOK®, LINKEDIN®, blogs, etc.), location information, landmark/maps, service catalog, voice, image repositories, etc. The profile engine 346 may infer a user's preferences from the preferences and affinity graph edge weights of users who have profiles otherwise similar to a user's profile.

In one or more embodiments, the user profile engine 346 estimates user micro-task preferences in response to factors such as language translation, voice training, image classification, related to location or geo-spatial context, end user device characteristics, etc. The profile engine 346 may use a plurality of data such as historical calling record data, data from the user computing devices (e.g., smartwatch, mobile device, etc.), data that enable to learn activity/task preference of the user at a particular context (e.g., time of the day), analyzing historical in-call engaging activities of the user, including: entertainment (e.g. music, poems, videos, images, etc.), educational material (e.g. facts, lectures, audiobooks), radio or podcasts, alerts or news (e.g. alerts of relevant information such as athletics scores, stock market changes, new technology), etc.

The profile engine 346 develops the user profile 327 in response to aggregated data such as previous call logs, identified skill, expertise and knowledge levels, past experiences, etc. and stores the user profile 327 in the user profile database 310. In one or more embodiments, the profile engine 346 updates and refines the user profile 327 by inferring the user cognitive state, with a certain confidence level C, wherein input parameters for understanding the cognitive state of the user may include:

Physiologic data of the user (monitored using wearables and related devices).

Time of the day.

User's schedule or calendar activity.

Conversation/ambient noise monitoring.

Geo-spatial metrics.

Social media profile information.

The affinity engine 344 makes use of the user characteristics from the user profile engine 346 to refine the affinity graph edge weights based on characteristics of each micro-task such as the type of micro-task (e.g. language translation from English to Swahili, in such instances, a high edge weight will be assigned between the language translation micro-task and a user who can speak both Swahili and English). This allows the affinity engine 344 to also calculate and assign affinity scores or edge weights between micro-tasks and a new user for whom no micro-task history is known.

In some embodiments, affinity scores incorporate user-task affinity, user-context affinity, user-user affinity, etc. The data for various affinity measures are obtained from historical micro-task execution, and other data sources such as user electronic calendar, social media data (e.g. twitter, Facebook, etc.) and other crowdsourced public data to determine or infer the user cognitive and affective states, user profile 327 and context, as well as to determine the profile of a user's location.

Furthermore, the method of assigning affinity scores between micro-tasks and a given user takes into consideration the user cognitive state (e.g., anger or distraction level) and/or behavior (e.g., erratic behavior), preference, etc. By a way of implementation, the user cognitive state and behavior can be measured by converting the voice or speech into text, sampling segments in real time, determining the anger level, erratic behavior, emotion level, etc. using multiple learning models that are trained using data collected over a period of time and algorithms (e.g., IBM's tone analyzer). Thus, the profile engine 346 monitors the user cognitive state as discussed above.

Since the history of the user is stored and appropriate correlations or micro-tasks are provided, implicit or explicit feedback is dynamically evaluated based on the changing cognitive state of the user. End to end machine learning algorithm can be used to store the context, micro-tasks, user profile 327 and the dynamic user interests to determine the affinity scores to the user-tasks relationship.

Through analysis of the user profile 327 and other factors (including the affinity scores), the micro-task generator 320 may be trained to generate more granular micro-tasks associated with a plurality of features in relation to the on-hold user profile 327. As a way of an example, from historic micro-tasks, the micro-task generator 320 may facilitate a question-answering micro-task of a user's opinion of a presidential candidate or opinion of a new shampoo advertisement. For micro-tasks in this category, the micro-task generator 320 may receive the amount offered and the number of responses received from users.

The micro-task matching module 304 receives the user profile 327 from the user profiling and task affinity module 302, and pulls active micro-tasks from the micro-task database 316. Using factors such as the type of task, user profile data (e.g. language spoken, expertise, etc.) and the duration of the micro-task and estimated down-time, these factors are taken as input into a task ranker algorithm, and the micro-tasks are ranked based on these factors. The micro-task matching module 304 then relays the top n micro-tasks to the user-micro-task manager 306. The micro-task matching module 304 includes a micro-task ranker 348 and a micro-task selector 350. When the customer service manager module 308 detects that a given user has "down-time", e.g. is on hold for customer service, then the customer service manager module 308 prompts the micro-task matching module 304 to retrieve a user's affinity data from the user profiling module 302. In response to the affinity data, the micro-task ranker 348 sorts micro-tasks from the micro-task and responses database 316 to surface the micro-tasks most relevant to the given user. The micro-task selector 350 then leverages the down-time estimated by the down-time estimator 305 in order to filter micro-tasks that can be completed within the estimated down-time. In another embodiment, this can be modelled as a scheduling or optimization problem, where the time taken T for each micro-task and reward R are optimized to fit into the estimated amount of time the user has available during their call.

The user-micro-task manager 306 presents micro-tasks to users, automatically determines an appropriate modality to present the micro-tasks, and aggregates responses from the users. If desired, based on the types and requirements of the micro-task, and the on-hold user devices and communication channels used (e.g. mobile, basic phone, etc.), in one embodiment the user-micro-task manager module 306 may select an appropriate micro-task by re-ranking the micro-tasks (over-riding the affinity weights), responsive to user context. For example, an image labelling micro-task will be ranked lower than an audio-based micro-task, even though a given user has higher affinity for image labelling micro-tasks, due to detected constraints of the user device. If desired, the user-micro-task manager module 306 may convert the micro-tasks from one modality/format to another. By way of an example, a text-based micro-task is converted into an audio micro-task and the responses of the user converted from audio to text because the user is using a basic phone (no text display).

Optionally, the user-micro-task manager module 306 can also engage with the user's wearable devices to better understand the contextual situation with the schedule of the user (monitored from user's mobile device, access to calendar entries, mail, battery, etc.) and geo-spatial metrics to appease the user by providing the most probable choice. For instance, if the user's heart rate is at an elevated level and the GPS location tracks that the user is taking a routine walk in the morning (wearable device, GPS location, date and time combined), in that case, instead of the video or visual content, competitive micro-tasks can be provided to the user based on the steps completed. Once the user completes X number of steps while walking and waiting on the call, a new game from an app store can be unlocked for the user.

Figure 6:
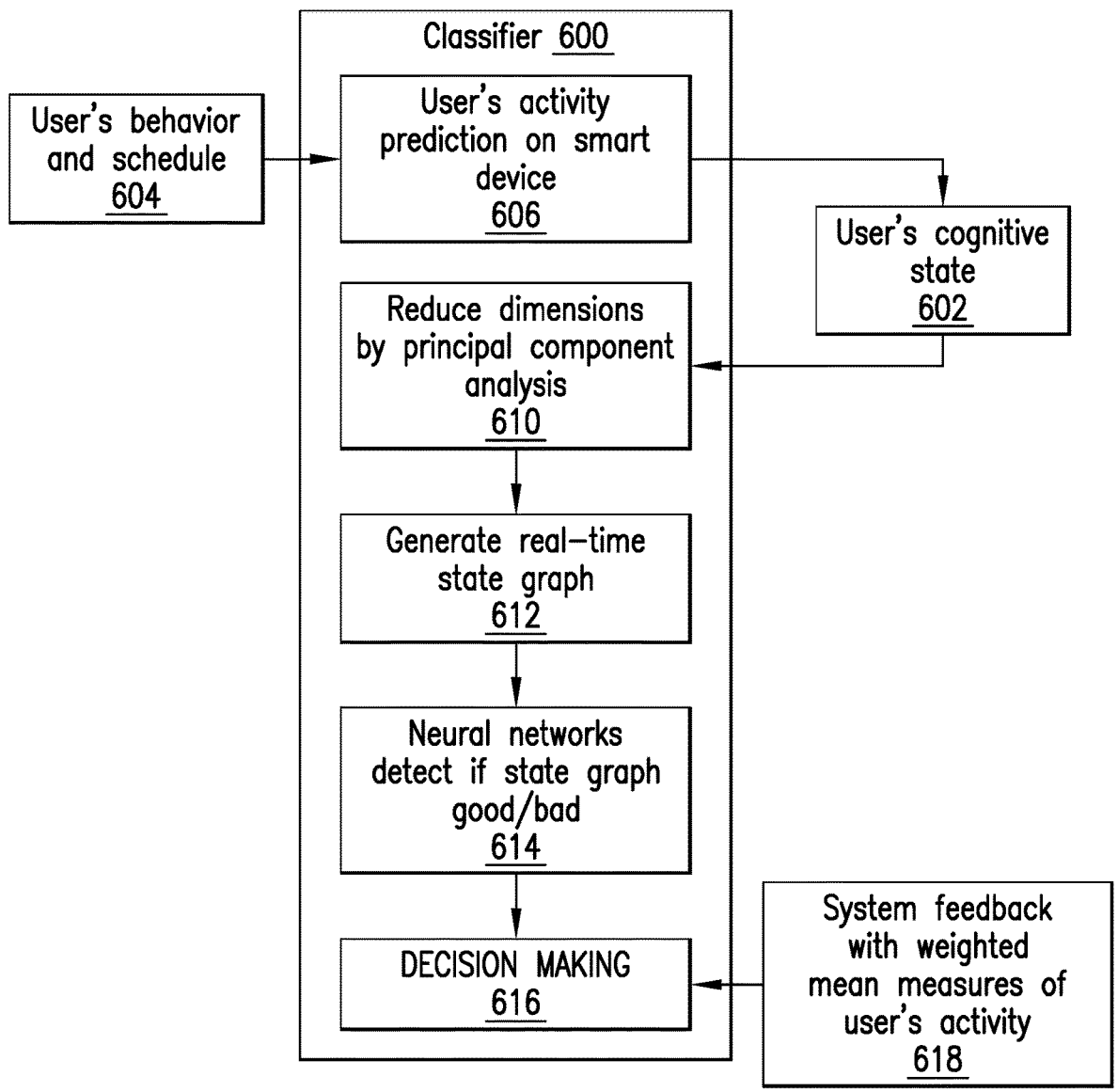
FIG. 6 depicts use of a classifier to further characterize the on-hold user profile and cognitive state, according to an exemplary embodiment.

Furthermore, the user-micro-task manager module 306 can engage in tone analysis to understand the varying satisfaction levels of the user and dynamically adjust incentive structures to keep the user engaged in time filling micro-tasks. For example, FIG. 6 depicts the use of a classifier 600 to characterize a cognitive state 602 of the user (part of the user profile 327), based on the user's behavior and schedule 604. The cognitive state 602, as a part of the user profile 327, helps guide generation of rules for effective micro-task selection and instantiation. As another example, the user-micro-task manager 306 can leverage IBM's Watson Tone Analyzer to assess the progress of a communication involving the user.

Once the user-micro-task manager module 306 has aggregated a user's responses, these are passed back to the micro-task creation and rewards module 300, where the responses are stored into the micro-tasks and responses database 316 while the payment gateway 325 calculates rewards based on the number of responses and relays the rewards to the user.

As shown in FIG. 6, the classifier 600 receives indications of the user's behavior and schedule 604, such as but not limited to phone usage, movement, etc. This can be received in real-time in or offline and be numeric and textual in format and contain data like amount of time spent on an app, location, distance travelled, etc. At 606 (user activity prediction) the classifier 600 labels the behavior to predict the user's activity and then assigns a cognitive state 602 to these labels. In 610, the classifier 600 converts the labelled data with activities and cognitive states into a set of values of linearly uncorrelated variables called principal components. Principal component analysis is a technique for reducing the dimensionality of datasets, increasing interpretability but at the same time minimizing information loss. It does so by creating new uncorrelated variables that successively maximize variance. Principal component analysis advantageously eliminates duplication in the data. This works so that the first principal component has the highest variance (accounts for as much of the variability in the data as possible), and each succeeding component in turn has diminishing variances. This has the property of finding the key varying cognitive states and activities within the data. This is used to create a state graph with previous cognitive states in 612 and passed through a neural network to determine at 614 whether the cognitive state transitions would leave the user in a good/bad state. Thus, the classifier 600 detects the on-hold customer's intermediate satisfaction levels by generating a training model via principal component analysis 610 for reduced complexity in terms of dimensions and input features. The classifier 600 detects dynamic positive or negative user experience based on real time analytics. This will be used as input to a decision making process at 616 that dynamically reconfigures the appropriate activities or selectable items in order to provide incentives for the customer and ameliorate the customer experience.

The system feedback shown at 618 finally checks the wait time polling being done with respect to the user's cognitive levels and interests in relation to micro-tasks that the on-hold user has performed so far. In order to keep the user engaged and maximize the user customer experience, the decision-making section involves offering micro-tasks including rating music, games, trading cryptocurrency, translating content, suggesting games to generations, jogging etc. The wait time polling service takes into consideration the estimated amount of time the user is likely to wait on-hold and micro-tasks that can fill that wait time that align with their interests. Cognitive level is the same as cognitive state. The Task Ranker ranks the micro-tasks available based on a user's profile. The Decision Making step is responsible for offering appropriate micro-tasks.

To appreciate the various embodiments disclosed in this invention, consider the below exemplary scenario driven from real-world use case.

User A calls Airline One from a smartphone to reschedule an upcoming trip from City One to City Two.

The down-time estimator module 305 estimates a down-time for a next available customer service agent as 9 minutes. For example, the down-time estimator module 305 estimates the down-time by monitoring the available customer service agents, their expected time of completing with their engaged customer, the number of customers in queue, and other characteristics such as predicted service down time, congestion time, etc. In other embodiments, not related to customer service call hold time, the down-time estimator module 305 estimates down-time based on, for example, traffic conditions and distance to travel to obtain an estimated trip duration in a vehicle not driven by the user (e.g., plane, train, autonomous vehicle).

Based on historic data, the user profiling module 302 shows User A exhibits persistent high engagement in social media (e.g., User A oftentimes comments on topics related to Language A and Language B language use among others). Further, from User A's profile model (skill, expertise and knowledge levels, past experiences, visited location/site history, social media postings, etc.) the profile engine 346 infers high preference for multi-lingual translation and knowledge of several locations/sites around City One. Thus, the affinity engine 344 infers (with a confidence score 0.8) that User A could label language translations or identify photos geo-tagged in City One. Further, the profile engine 346 infers no cognitive load given User A's current context.

Accordingly, the micro-task generator 320 produces at least two micro-tasks, the reward engine 324 produces associated rewards (incentives), the micro-task ranker 348 sorts the micro-tasks into a ranked list, and the micro-task selector 350 presents the micro-tasks to User A responsive to the estimated wait time. The micro-task selector 350 logically partitions the estimated down-time into N segments (temporal/spatial) to optimally sequence the generated or selected micro-tasks based on the on-hold user profile 327 and factors such as device characteristics, geo-spatial metrics, etc. For example, in one embodiment, the micro-task selector 350 partitions the estimated waiting time W into dynamical logical time segments/windows. Given the Estimated Waiting Time window W, a set of generated micro-tasks T={T1, T2, ... TN}, the micro-task selector 350 implements two functions:

Determine ($\Delta$): Preserve a time $\Delta$ that is needed for activities unrelated to micro-tasks, by taking into consideration various contextual factors (e.g., user interaction level, device characteristics);

Split (W, T): Divide the time W into K logical partitions (w1, w2 ..., wK) such that wi enables the user to execute Ti, etc. The split function needs to satisfy the property W minus sum (w1, w2 ..., wK) greater than or equal to $\Delta$. For example, a linear quick-sort algorithm can be used.

Consider two exemplary tasks.

Task one: translation of two spoken phrases to texts, which is computed to take 2 minutes, given User A's profile.

Task two: tagging a location on a map, which is computed to take 3 minutes.

In response to User A accepting the micro-tasks, the user-micro-task manager module 306 presents micro-task one followed by micro-task two. Consequently, User A completes micro-task one in 1 minute and 54 seconds, and completes micro-task two in 3.1 minutes.

Note that the system already has the knowledge of User A's smartphone from the fingerprint/UUI of the device. This allows the system to map the device usage to the specific user.

User-micro-task manager module 306 compares the responses against previously submitted responses by other on-hold users (obtained from the micro-tasks and responses database 316) and computes the reward for User A.

Various embodiments relate to determining the micro-task selection factors, calculating and assigning affinity scores to a user-tasks relationship in order to infer an affinity for the new user to the existing micro-tasks, and generating various rewarding schemes (e.g., using crypto-currencies such as bitcoin).

For further detail regarding reward schemes, consider that in one or more embodiments the reward engine 324 assigns an incentive or reward as a function of various parameters, including micro-task importance, micro-task completion, quality of responses, etc. In some sense, the reward category and amount can be calculated dynamically based on the availability of active on-hold users, and factors such as user profile 327, historic reward preferences (e.g. if they have selected bitcoin as their mode of payment), the average/minimum amounts for which they have completed micro-tasks, types of preferred micro-tasks, etc. Thus, the reward engine 324 computes a recommended reward size and type to offer a user based on historic logs of similar micro-task, in cases where there is a large variation between the system's estimated reward and the reward entered by the micro-task requestor, an alert is sent back recommending the requestor to amend this. The cost and reward category is computed as a function of historic micro-tasks, estimated completion times of similar micro-tasks, estimation of cognitive workload, and number of active on-hold users available to complete the micro-task. Of course, the system may learn the kind of feedback, options, activities, etc. that the user actually benefits from (based on the user's satisfaction level inferred from continued interest in a topic or repeated performance of micro-tasks rewarded in a particular manner). Also, along with using data from individual users, cohorts or crowd-based inferences can be made for specific groups of people (e.g. young, users, adults, etc.). This data can be obtained in an anonymized way using an opt-in approach. Thus, by using the wisdom of crowds for a particular cohort of user (e.g. young, user with autism, adult, etc.), the system as a whole may benefit from such monitoring of user within cohorts, when such information can be obtained. Of course, such monitoring should be done on an opt-in basis, and/or appropriate anonymization should be applied. Exemplary rewards include unlocking music, games, or other media content from an app store or download service, earning crypto-currency, collecting travel points on flights, etc.

As an example, when a user has music choices in a social media profile and has posted interest in rating podcasts or audio songs, the user is requested to rank songs or podcasts as a micro-task. As an incentive, the user can be rewarded for the ranking micro-task with different forms of crypto-currency in case the user's profile (e.g., social media posts) indicates interest in mining or otherwise collecting crypto-coins.

Figure 7:
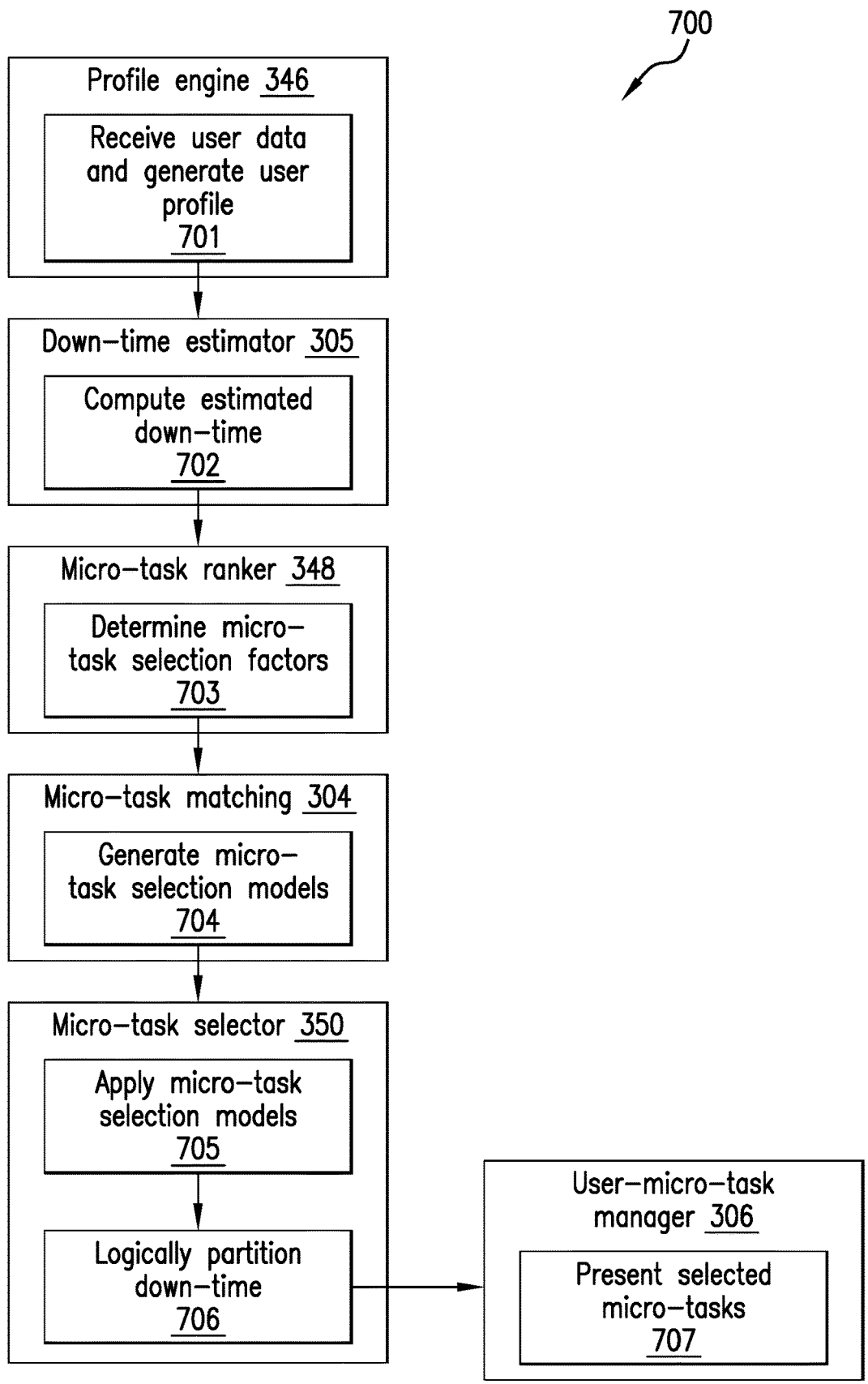
FIG. 7 depicts a method for facilitating micro-task performance during down-time, according to an exemplary embodiment.

Thus, referring to FIG. 7, the components of the interactive system 96 implement a method 700 for facilitating micro-task performance during down-time. At block 701, the profile engine 346 receives a set of user data (e.g., historical calling record data, data from the user computing devices or sensors such as smartwatch, mobile device, etc.) and generates a user profile 327 including skill, expertise, knowledge levels, past experiences, etc. At block 702, the down-time estimator module 305 computes an estimated down-time T by predicting down-time context (e.g., using currently available or online customer services agents, a number of customers in queue, predicted service downtime, congestion time, etc.). At block 703, the micro-task ranker 348 determines micro-task selection factors with micro-task classes or types (e.g., language translation, voice to text training, image classification, location context, etc.) based on affinity data (task edge weights) from the affinity engine 344, and generates a ranked list of micro-tasks. At block 704, the micro-task matching module 304 generates micro-task selection models that account for the estimated down-time, the user profile 327, and the micro-task selection factors generated by the micro-task ranker 348. At block 705, the micro-task selector 350 applies the micro-task selection models to select a subset of the ranked list of micro-tasks, based on level of difficulty, time to complete, and available down-time. At block 706 the micro-task selector 350 logically partitions the estimated down-time into N temporal segments to optimally sequence the selected micro-tasks. At block 707 the user-micro-task manager module 306 then presents the selected micro-tasks to the user via the user's device. In one or more embodiments, the user-micro-task manager module 306 interrupts operation of the user's device and backgrounds previously running processes in order to present the selected micro-tasks. For example, in case the user device is displaying an "in call" screen, the user-micro-task manager module 306 would replace the screen with a micro-task screen and would put the voice call on speaker phone so that the user can interact with the micro-task. In case the micro-task might be an audio micro-task, the user-micro-task manager 306 would place the call "on hold" until a voice is detected at the other end of the call.

Given the discussion thus far, it will be appreciated that, in general terms, an exemplary method, according to an aspect of the invention, includes obtaining a user profile that includes a user's affinities to each of a plurality of micro-tasks; estimating a duration of down-time for the user; estimating task selection factors responsive to the user profile and to the estimated duration of down-time; generating a list of micro-tasks responsive to the task selection factors; ranking the list of micro-tasks according to the user's affinities; partitioning the down-time according to the ranked list of micro-tasks; and presenting one or more of the micro-tasks to the user, according to the partitioning of the down-time, by altering operation of a user device.

In one or more embodiments, the user profile further includes user demographic data. One or more embodiments of the exemplary method also include dynamically updating the user profile according to user cognitive state or user context. For example, user context may include a location of the user, or a listing of applications currently running on a user device.

In one or more embodiments, the down-time is partitioned to present the highest affinity micro-task first. Alternatively, the down-time is partitioned to present the shortest duration micro-task first.

In one or more embodiments, the task selection factors include an estimated time to perform each micro-task. In one or more embodiments, the task selection factors include an estimated level of skill to perform each micro-task. In one or more embodiments, the task selection factors include a category of each micro-task. In one or more embodiments, the task selection factors include a listing of capabilities of a user's device.

In one or more embodiments, the user profile includes the user's history of task completion.

One or more embodiments of the exemplary method further include generating rewards corresponding to the list of micro-tasks in response to the user profile. For example, the rewards are generated according to estimated time to complete each of the list of micro-tasks. As another example, the rewards are generated according to estimated importance of each of the list of micro-tasks. As another example, the rewards are generated according to a category of each of the list of micro-tasks.

Figure 8:
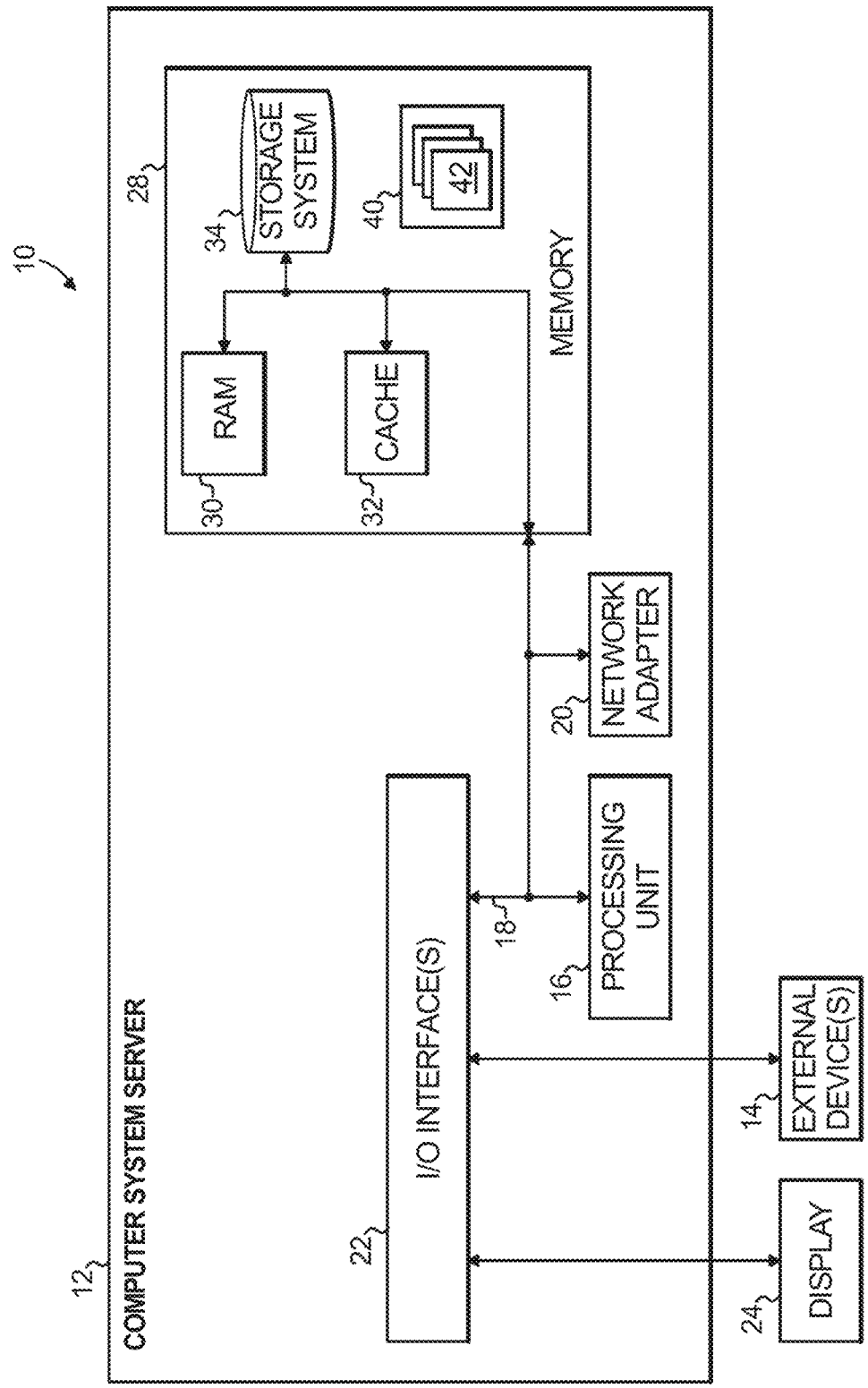
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular micro-tasks or implement particular abstract data types. Computer system/server 12 may be practiced in distributed cloud computing environments where micro-tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   implementing, by one or more computer processors, the steps of:
   generating a user profile that includes a user's affinities to each of a plurality of micro-tasks as well as a context of the user, wherein the context of the user incorporates at least a combination of a geo-spatial component and a physiologic component simultaneously tracked in real-time by the user's wearable device;
   estimating a duration of down-time for the user;
   estimating task selection factors responsive to the user profile and to the estimated duration of down-time;
   generating, by a neural network that has learned a pattern of micro-task types corresponding to user profile data, a list of micro-tasks responsive to the task selection factors;
   assigning labels to the micro-tasks in the list of micro-tasks, using custom natural language processing, in response to content initially provided by creators of the micro-tasks, wherein the content comprises a description, type of activity, and responses required;
   ranking the list of micro-tasks by comparing the labels to the user's affinities;
   partitioning the down-time according to the ranked list of micro-tasks; and
   presenting one or more of the micro-tasks to the user, according to the partitioning of the down-time, by dynamically optimizing display elements of a user device to focus on the one or more micro-tasks while taking into consideration characteristics of the user device.

2. The method of claim 1 wherein the user profile further includes user demographic data.

3. The method of claim 1 further comprising dynamically adjusting incentive structures and micro-task selection to keep the user engaged in time filling micro-tasks in response to tone analysis of communications by the user.

4. The method of claim 1 further comprising dynamically updating the user profile according to user context.

5. The method of claim 4 wherein the user context includes a listing of applications currently running on a user device.

6. The method of claim 1 wherein the down-time is partitioned to present the highest affinity micro-task first.

7. The method of claim 1 wherein the down-time is partitioned to present the shortest duration micro-task first.

8. The method of claim 1 wherein the task selection factors include an estimated time to perform each micro-task.

9. The method of claim 1 wherein the task selection factors include an estimated level of skill to perform each micro-task.

10. The method of claim 1 wherein the task selection factors include a category of each micro-task.

11. The method of claim 1 wherein the task selection factors include a listing of capabilities of a user's device.

12. The method of claim 1 wherein the user profile includes the user's history of task completion.

13. The method of claim 1 further comprising generating rewards corresponding to the list of micro-tasks in response to the user profile.

14. The method of claim 13 wherein the rewards are generated according to estimated time to complete each of the list of micro-tasks.

15. The method of claim 13 wherein the rewards are generated according to estimated importance of each of the list of micro-tasks.

16. The method of claim 13 wherein the rewards are generated according to the labels of each of the list of micro-tasks.

17. A non-transitory computer readable medium embodying computer executable instructions which when executed by a computer cause the computer to facilitate the method of:
   generating a user profile that includes a user's affinities to each of a plurality of micro-tasks as well as a context of the user, wherein the context of the user incorporates at least a combination of a geo-spatial component and a physiologic component simultaneously tracked by the user's wearable device;
   estimating a duration of down-time for the user;
   estimating task selection factors responsive to the user profile and to the estimated duration of down-time;

generating, by a neural network that has learned a pattern of micro-task types corresponding to user profile data, a list of micro-tasks responsive to the task selection factors;

assigning labels to the micro-tasks in the list of micro-tasks, using custom natural language processing, in response to content initially provided by creators of the micro-tasks, wherein the content comprises a description, type of activity, and responses required;

ranking the list of micro-tasks by comparing the labels to the user's affinities;

partitioning the down-time according to the ranked list of micro-tasks; and presenting one or more of the micro-tasks to the user, according to the partitioning of the down-time, by dynamically optimizing display elements of a user device to focus on the one or more micro-tasks while taking into consideration characteristics of the user device.

18. An apparatus comprising:

a memory embodying computer executable instructions; and at least one processor, coupled to the memory, and operative by the computer executable instructions to facilitate a method of:

generating a user profile that includes a user's affinities to each of a plurality of micro-tasks as well as a context of the user, wherein the context of the user incorporates at least a combination of a geo-spatial component and a physiologic component simultaneously tracked by the user's wearable device;

estimating a duration of down-time for the user;

estimating task selection factors responsive to the user profile and to the estimated duration of down-time;

generating, by a neural network that has learned a pattern of micro-task types corresponding to user profile data, a list of micro-tasks responsive to the task selection factors;

assigning labels to the micro-tasks in the list of micro-tasks, using custom natural language processing, in response to content initially provided by creators of the micro-tasks, wherein the content comprises a description, type of activity, and responses required;

ranking the list of micro-tasks by comparing the labels to the user's affinities;

partitioning the down-time according to the ranked list of micro-tasks; and presenting one or more of the micro-tasks to the user, according to the partitioning of the down-time, by dynamically optimizing display elements of a user device to focus on the one or more micro-tasks while taking into consideration characteristics of the user device.

19. The apparatus of claim 18, the method further comprising dynamically updating the user profile according to user cognitive state.

\* \* \* \* \*